(12) United States Patent
Arosio

(10) Patent No.: US 7,413,161 B2
(45) Date of Patent: Aug. 19, 2008

(54) QUICK COUPLING WITH A COMPENSATION OF THE COUPLING TOLERANCES

(75) Inventor: Massimo Arosio, Treviglio (IT)

(73) Assignee: Faster S.p.A., Rivolta, D'Adda (IT)

( * ) Notice: Subject to any disclaimer, the term of this patent is extended or adjusted under 35 U.S.C. 154(b) by 89 days.

(21) Appl. No.: 11/516,283

(22) Filed: Sep. 6, 2006

(65) Prior Publication Data
US 2007/0051912 A1    Mar. 8, 2007

(30) Foreign Application Priority Data
Sep. 7, 2005    (IT)    ............ MI2005A1643

(51) Int. Cl.
*F16K 51/00*    (2006.01)
*F16L 29/00*    (2006.01)
*F16L 37/28*    (2006.01)

(52) U.S. Cl. ............ 251/149.6; 251/149.1
(58) Field of Classification Search ............ 251/149.1, 251/149.3, 149.6, 149.7
See application file for complete search history.

(56) References Cited

U.S. PATENT DOCUMENTS

| | | | | |
|---|---|---|---|---|
| 2,730,382 | A * | 1/1956 | De Mastri | ............ 285/277 |
| 5,884,897 | A * | 3/1999 | Arosio | ............ 251/149.6 |
| 6,908,070 | B2 * | 6/2005 | Bartos et al. | ............ 251/149.6 |
| 7,213,611 | B2 * | 5/2007 | Flynn | ............ 137/505.25 |

* cited by examiner

Primary Examiner—John K Fristoe, Jr.
(74) Attorney, Agent, or Firm—Kirschstein, et al.

(57) ABSTRACT

A tolerance compensated quick coupling comprises a projecting or bulging portion of a male coupling, which can be axially driven in a valve body, the coupling projecting or bulging portion ending with a flange inside the valve body, said flange in said valve body being followed by an axially movable annular body which, through a spring bearing on the bottom of the valve body, is pressed against the flange, the movable annular body having, on a side thereof facing the flange, a circumferential slot housing a sealing ring element contacting an inner surface of the flange, the movable annular body being moreover provided, on an outer circumferential side thereof, with a slot in which is engaged a circumferential sealing ring contacting an inner wall of the valve body.

4 Claims, 2 Drawing Sheets

QUICK COUPLING WITH A COMPENSATION OF THE COUPLING TOLERANCES

BACKGROUND OF THE INVENTION

The present invention relates to a coupling-tolerance compensated quick coupling.

It is already known in the prior art to provide a plurality of quick couplings which are assembled, for example, to multi-connection plates, thereby providing a plurality of connections between a plurality of quick couplings.

The above mentioned prior solutions are used, for example, in complex machine tools or other working apparatus, including several driving motors and units to be controllably supplied with a pressurized fluid.

Because of position tolerances, existing between the quick couplings mounted on the multi-connection plates, in order to provide a perfect connection of the male portions mounted on a multifunctional plates and the female couplings mounted on another multiconnection plates, are conventionally provided radial compensating means, allowing to provide a precise connection, together with a perfect compensation of coupling offsets due to tolerances existing between the quick coupling components to be connected.

To that end, the prior art also discloses a male coupling, which can be driven through small radial displacements with respect to a middle line of the male coupling supporting body.

The provision of a male coupling, to be radially driven for compensating for, in the connection step, possible offsets due to position tolerances of a plurality of couplings, has the drawback of causing undesired fluid leakages during the connection and disconnection operations, because of an insufficient sealed arrangement.

SUMMARY OF THE INVENTION

Accordingly, the main object of the present invention is to overcome the above mentioned drawbacks of the prior art and provide a male coupling, including a projecting bulged portion which can be radially driven, thereby safely preventing any operating fluids from leaking.

The above object is achieved by a coupling tolerance-compensated quick coupling, comprising a projecting or bulging portion of a male coupling, which can be radially driven inside a valve body, said projecting or bulging portion of said coupling ending in said valve body with a flange and wherein, following said flange, in said valve body an annular axially movable body is further arranged, said annular body, through a spring bearing on a bottom of said valve body, being pressed against said flange, said axially movable annular body including, on a front side thereof facing said flange, a circumferential slot in which a sealing ring contacting the inner surface of said flange is engaged and wherein, moreover, said axially movable annular body further comprises, on an outer circumferential side thereof, a slot in which a circumferential sealing ring contacting an inner wall of said valve body is engaged.

BRIEF DESCRIPTION OF THE DRAWINGS

Further characteristics and advantages of the present invention will become more apparent from the dependent claims and the following detailed disclosure of an exemplary embodiment of the invention which is illustrated, by way of an indicative but not limitative example, in the accompanying drawings, where:

DESCRIPTION OF THE PREFERRED EMBODIMENT

Figure 1:
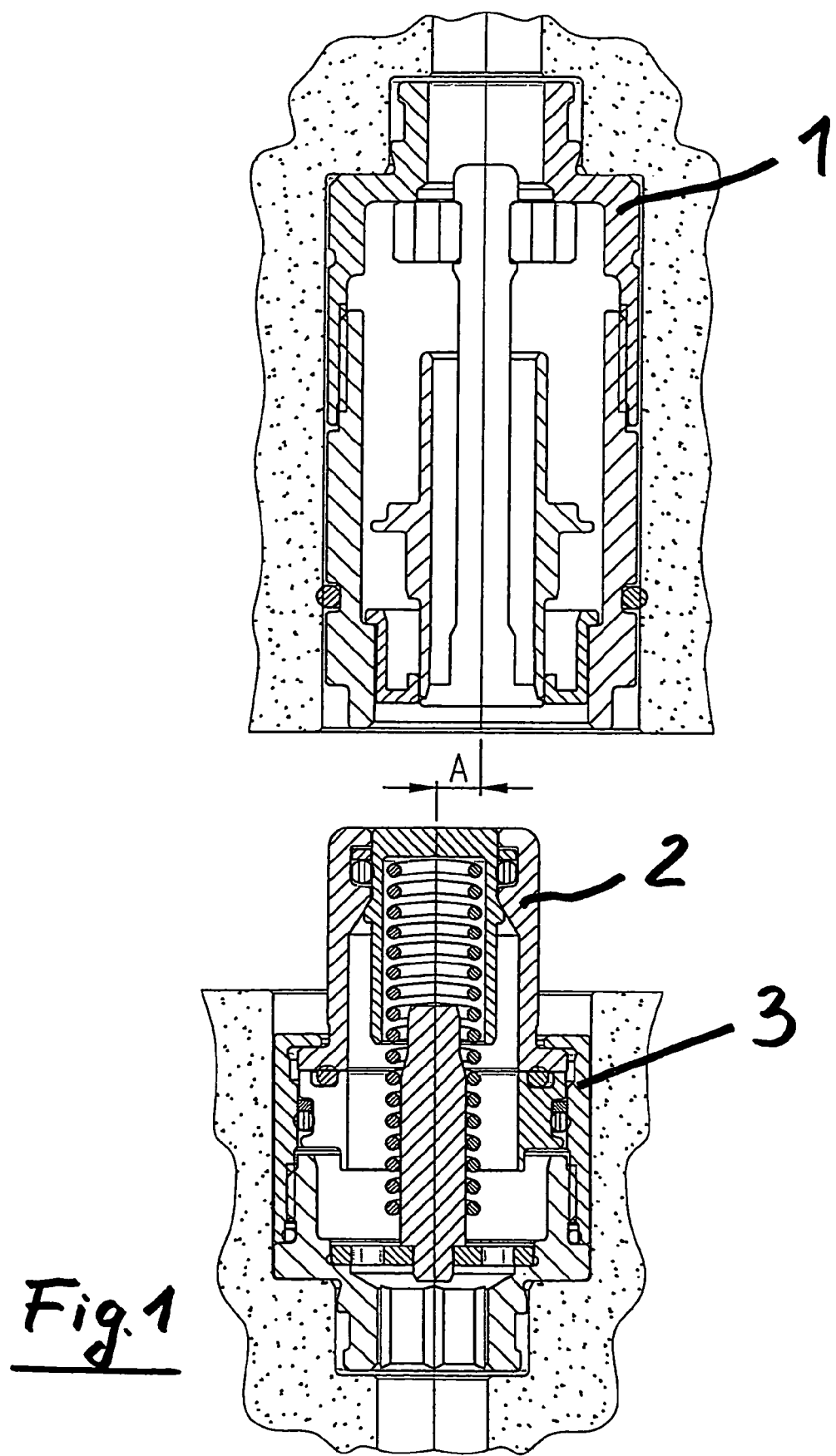
FIG. 1 is a schematic cross-sectional view showing a quick coupling including a female quick coupling portion and a male quick coupling portion.

FIG. 1 shows the female portion 1 of a quick coupling to which, during the coupling operation, a projection or bulging portion 2 of a male coupling, generally indicated by the reference number 3, can be connected.

Quick couplings comprising a female portion 1 and a male portion 3 are already known in the prior art.

The projecting portion 2 of said male coupling. M is supported in said male or body portion 3 so as to be radially driven (arrow f).

Figure 2:
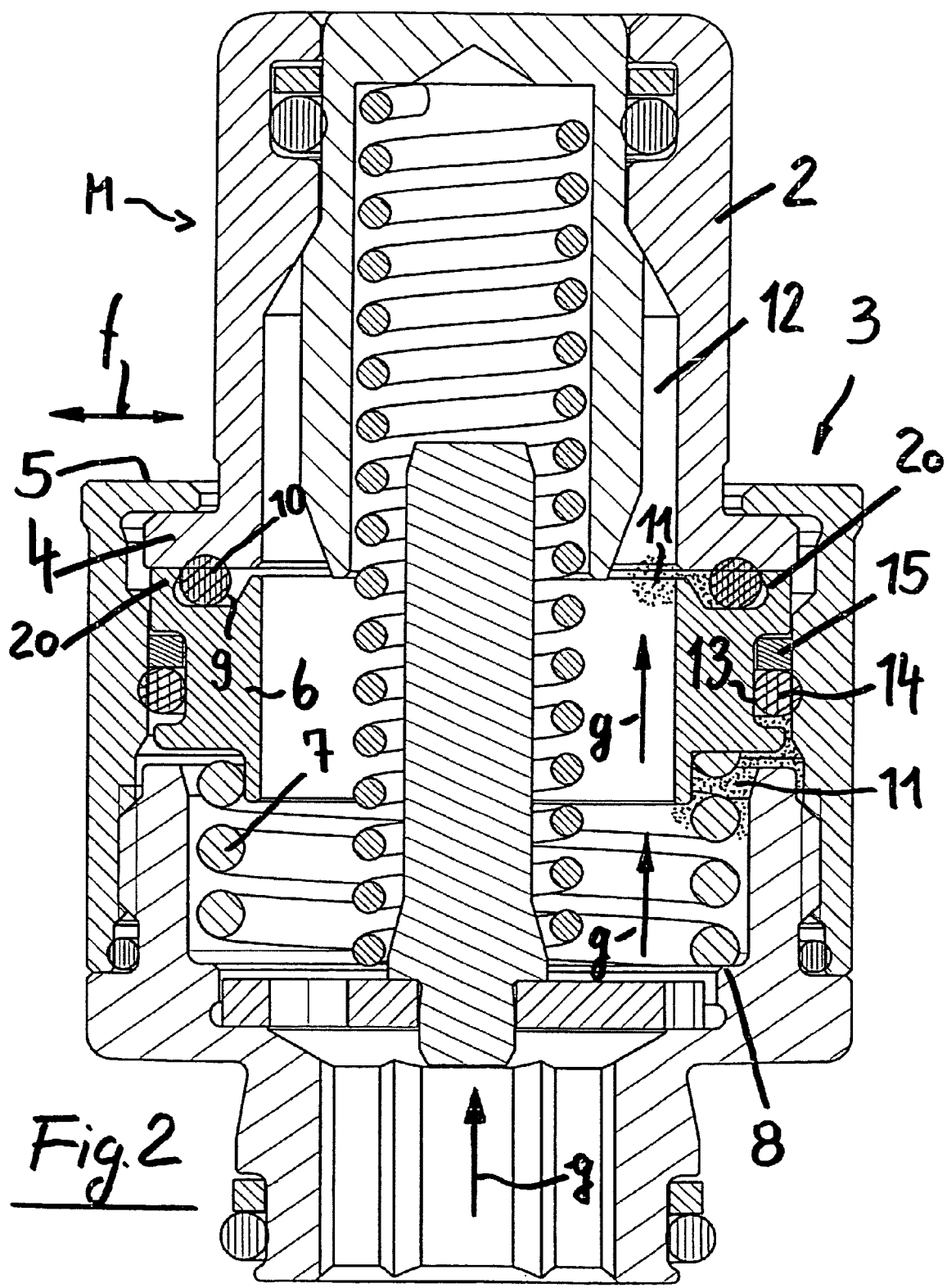
FIG. 2 is a further cross-sectional view, on an enlarged scale, of the quick coupling male portion.

As is clearly shown in FIG. 2, the projecting or bulging portion 2 comprises, on a side thereof facing the inside of the valve body 3, a flange 4 contacting the inner wall of a circumferential collar 5 of the valve body 3.

Against the inner side of said flange 4, bears an end portion of an annular body 6 which, through a coil spring 7, bearing on the bottom 8 of the valve body 3, is pressed against the flange 4 of the projecting portion 2.

In particular, the pressurized fluid is supplied to the male coupling M in the direction schematically indicated by the arrows g.

Thus, owing to the pressing spring 7, the annular body 6 is permanently pressed, with a given pressing force, against the inner surface of the flange 4 of the projecting portion 2, thereby providing a first sealing region.

The annular body 6 is moreover provided, on a front side thereof facing said flange 4, with a circumferential slot 9 in which a resilient material sealing ring element 10 is engaged.

More specifically, said sealing ring 10 is abutted against the inner surface of the flange 4, thereby providing a sealing means preventing the fluid portion schematically indicated by 11 from leaking from the valve chamber 12.

On the radially outer side thereof, the slot 9 is delimited by a wall 20 which is bent in a hook bending arrangement radially towards the inside of said chamber 12, thereby safely locking said sealing ring 10 in its sealing position, while preventing said ring element 10 from being ejected by the pressurized fluid 11.

The annular body 6 is moreover provided with an outer circumferential slot 13, in said circumferential slot 13 being also engaged a resilient material sealing ring 14 restrained by a resilient ring 15.

As shown in the drawing, the sealing ring 14 is also affected by the pressurized fluid 11, as indicated in the drawing by a plurality of dots.

Moreover, FIG. 2 clearly shows that the diameter of the sealing ring 10 is less than the diameter of the sealing ring 14.

Since both the sealing rings 10 and 14 are subjected to the same pressure by the fluid 11 supplied in the direction shown by the arrows g, then the force provided by the sealing ring 14, of larger diameter and accordingly having larger surface affected by the fluid 11, will firmly press the annular body 6, and, accordingly, the resilient ring element 10, in cooperation with the spring 7, against the inner surface of the flange 4 thereby providing an enhanced sealing effect.

Thus, owing to the provision of the axially movable annular body 6 inside the quick coupling 2, 3, and the provision of a sealing ring 10 engaged in a circumferential slot 9 formed in the front surface of the annular body 6 and, moreover, owing to the provision of a sealing ring 14 engaged in a further slot 13 formed in a circumferential slot radially extending outside of the body 6, a very good sealing effect will be obtained.

The invention claimed is:

1. A coupling tolerance compensated quick coupling, comprising a projecting or bulging portion of a male coupling, which can be radially driven inside a valve body, said projecting or bulging portion of said coupling ending with a flange inside said valve body, characterized in that following said flange (4), in the inside of said valve body (3), is provided an axially movable annular body (6) which, through a spring (7) bearing on a bottom of said valve body (3), is pressed against said flange (4), that said axially movable annular body (6) comprises, on a front side thereof facing said flange (4), a circumferential slot (9) in which is engaged a sealing ring (10) contacting an inner surface of said flange (4) and that, moreover, said axially movable annular body (6) comprises, on an outer circumferential side thereof, a slot (13) in which a circumferential sealing ring (14), contacting an inner wall of said valve body (3) is engaged.

2. A coupling tolerance compensated quick coupling, according to claim 1, characterized in that said circumferential slot (9) is delimited, on an outer side thereof, by a delimiting wall (20) which is bent in a hook pattern toward the inside of a chamber (12).

3. A coupling tolerance compensated quick coupling, according to claim 1, characterized in that said sealing ring (14) engaged in said outer circumferential slot (13) of said axially movable annular body (6) is made of a resilient material, and that said sealing ring (14) is restrained at a target position by a further resilient ring (15).

4. A coupling tolerance compensated quick coupling, according to claim 1, characterized in that said sealing ring (10) has a diameter less than a diameter of said sealing ring (14).

* * * * *